US009774837B2

(12) United States Patent
Chang et al.

(10) Patent No.: US 9,774,837 B2
(45) Date of Patent: Sep. 26, 2017

(54) SYSTEM FOR PERFORMING DISTORTION CORRECTION AND CALIBRATION USING PATTERN PROJECTION, AND METHOD USING THE SAME

(71) Applicant: Electronics and Telecommunications Research Institute, Daejeon (KR)

(72) Inventors: Ji Ho Chang, Daejeon (KR); Dae Hwan Hwang, Daejeon (KR); Kwang Ho Yang, Gyeryong (KR); Eul Gyoon Lim, Daejeon (KR); Jae Il Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 232 days.

(21) Appl. No.: 14/688,982

(22) Filed: Apr. 16, 2015

(65) Prior Publication Data

US 2015/0304617 A1 Oct. 22, 2015

(30) Foreign Application Priority Data

Apr. 17, 2014 (KR) .......................... 10-2014-0045744

(51) Int. Cl.
*H04N 9/31* (2006.01)
*G06T 7/80* (2017.01)
(Continued)

(52) U.S. Cl.
CPC ............ *H04N 9/3191* (2013.01); *G06T 7/80* (2017.01); *H04N 9/3185* (2013.01);
(Continued)

(58) Field of Classification Search
CPC . G06T 2207/10012; G06T 2207/10028; G06T 7/0018; H04N 13/0246;
(Continued)

(56) References Cited

U.S. PATENT DOCUMENTS 7,313,265 B2 12/2007 Nakai et al.
9,128,366 B2 * 9/2015 Oda ........................ G03B 21/53
(Continued)

FOREIGN PATENT DOCUMENTS

KR 10-2010-0134403 A 12/2010
KR 10-2011-0003611 A 1/2011

OTHER PUBLICATIONS

Surman et al, Laser-Based Multi-user Multi-Modal 3D display, 2011.*
Ide et al, Adaptive Parallax for 3D Television, 2010.*

*Primary Examiner* — Shan Elahi (57) ABSTRACT

Disclosed are a system and method for performing distortion correction and calibration using a pattern projected by a projector. The system for performing distortion correction and calibration includes a projector that projects a pattern, at least one camera that generates a photographed pattern image by photographing an image onto which the pattern is projected, and an image processing device that calculates a calibration parameter by comparing an original pattern image projected by the projector and the photographed pattern image. Thus, it is possible to obtain an accurate depth image by easily utilizing an image for the pattern projected by the projector. In addition, when obtaining the depth image, the calibration parameter for correcting image distortion according to camera lens and a calibration state of cameras may be efficiently obtained using the pattern projected by the projector.

16 Claims, 5 Drawing Sheets (51) Int. Cl.
*H04N 17/00* (2006.01)
*H04N 13/02* (2006.01)

(52) U.S. Cl.
CPC .............. *H04N 13/0253* (2013.01); *G06T 2207/10012* (2013.01); *G06T 2207/10028* (2013.01); *H04N 13/0246* (2013.01); *H04N 17/004* (2013.01)

(58) Field of Classification Search
CPC ............ H04N 13/0253; H04N 17/004; H04N 9/3185; H04N 9/3191
USPC .................................................. 348/51, 189
See application file for complete search history.

(56) References Cited

U.S. PATENT DOCUMENTS

| | | | | |
|---|---|---|---|---|
| 2003/0184714 | A1* | 10/2003 | Yamagishi | G03B 21/005 353/31 |
| 2005/0185049 | A1 | 8/2005 | Iwai et al. | |
| 2009/0015730 | A1* | 1/2009 | Arakawa | H04N 9/3185 348/744 |
| 2009/0213337 | A1* | 8/2009 | Kondo | G03B 37/04 353/31 |
| 2013/0120362 | A1* | 5/2013 | Harris | H04N 13/0459 345/419 |
| 2013/0215220 | A1* | 8/2013 | Wang | H04N 13/021 348/43 |
| 2013/0314388 | A1* | 11/2013 | Oda | G03B 21/53 345/207 |
| 2014/0267614 | A1* | 9/2014 | Ding | H04N 13/0275 348/46 |

\* cited by examiner

FIG. 1

LEFT IMAGE  RIGHT IMAGE

SYSTEM FOR PERFORMING DISTORTION CORRECTION AND CALIBRATION USING PATTERN PROJECTION, AND METHOD USING THE SAME

CLAIM FOR PRIORITY

This application claims priority to Korean Patent Application No. 10-2014-0045744 filed on Apr. 17, 2014 in the Korean Intellectual Property Office (KIPO), the entire contents of which are hereby incorporated by reference.

BACKGROUND

1. Technical Field

Example embodiments of the present invention relate in general to a stereo vision system and more specifically to a system and method for performing distortion correction and calibration using a pattern projected by a projector.

2. Related Art

In recent years, in order to reproduce a natural three-dimensional (3D) image, an image synthesis method using a depth image has been widely used. The depth image is invisible to a viewer's eyes but is important information for determining the image quality of a synthesized image, and therefore it is important to acquire an accurate depth image.

The depth image may be acquired by a method of using an active depth sensor and a method of using a passive depth sensor. The method using the active depth sensor may directly acquire depth information using a physical sensor device (infrared sensor, or the like), whereas the method of using the passive depth sensor may calculate depth information from images obtained through at least two cameras.

In particular, stereo matching may acquire the depth information by finding pixels coinciding with pixels of one image from two images of the same scene obtained from mutually different viewpoints, from the other images. However, stereo vision has a large amount of computation due to complexity of an algorithm thereof, and there are some constraints in order to reduce the large amount of computation. Among the constraints, there is an epipolar line constraint in which matching points in the stereo vision are present on the same epipolar line in each image. Thus, most systems for acquiring the depth image have a hardware device or a software method which can adjust distortion correction and calibration with respect to cameras in order to satisfy the epipolar line constraint.

In a technology proposed by Caltech among the technologies related to the above description, a checkerboard with a predetermined pattern may be photographed in various angles and circumstances, and required parameters may be obtained through images about the photographed checkerboard.

Figure 1:
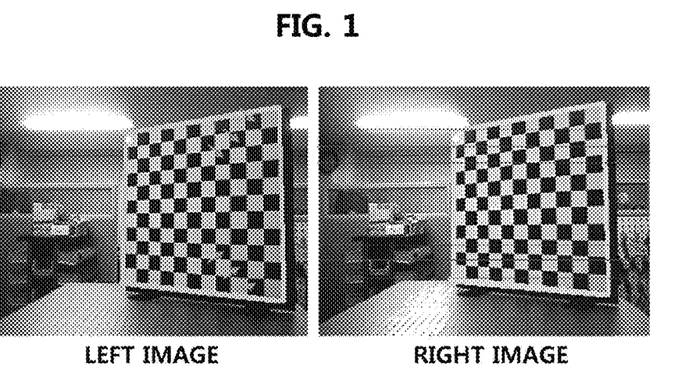
FIG. 1 is an exemplary view illustrating a method of calibrating cameras in a stereo vision system disclosed by Caltech.

FIG. 1 is a pre-treatment method proposed by Caltech, and in FIG. 1, an example in which rectangular vertices, shapes of the rectangular vertices, and an equation of a plane of a checkerboard constituted of the vertices and the shapes are extracted from images obtained by photographing a rectangular plane (checkerboard) having a chessboard-shaped pattern using a stereo camera to thereby match a calibration state of a left image and a right image is shown.

However, in this method, accuracy may be increased by an increase in the number of images obtained by photographing the checkerboard, and in particular, when it fails to photograph images about various angles and regions, an error may occur with respect to a region in which the checkerboard is not photographed.

Figure 2:
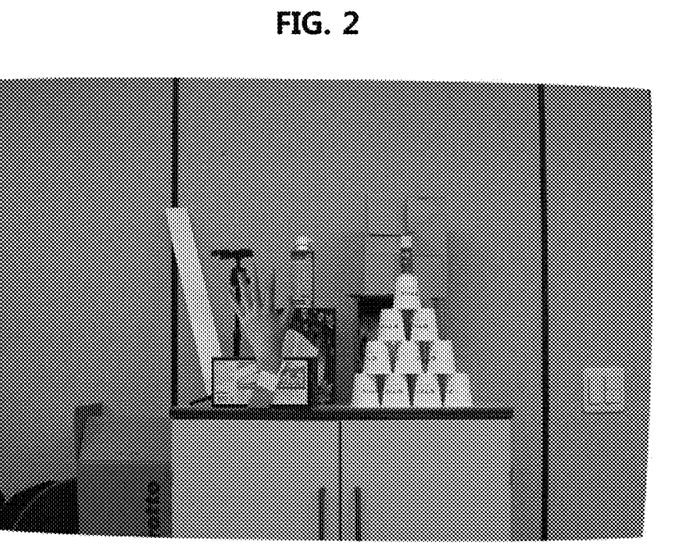
FIG. 2 is an exemplary view illustrating an image of a case in which wrongly calculated parameters are applied to technology proposed by Caltech.

FIG. 2 is an exemplary view illustrating an image of a case in which the technology proposed by Caltech is applied. Referring to FIG. 2, when applying parameters according to an image with respect to a checkerboard concentrated in the center of a photographed image, there is no problem in calibration and distortion correction of the center portion of the image, but it can be seen that severe distortion occurs at the edges of the image.

In addition, there is no method for completely fixing the cameras, and therefore, when the calibration state of the cameras is consequently shifted again due to slight distortion or the like in the use of the cameras, a process in which the images of the checkerboard are acquired again for the purpose of correction and parameters are newly extracted from the acquired images should be performed.

That is, in the method using an existing checkerboard, the accuracy may be increased by obtaining a large number of images in various locations of the entire image region. In addition, rectangular vertices that cannot be automatically found should be input directly by a user, and when the calibration is shifted, there is a problem that calibration should be performed again, or the like.

SUMMARY

Accordingly, example embodiments of the present invention are provided to substantially obviate one or more problems due to limitations and disadvantages of the related art.

Example embodiments of the present invention provide a system for facilitating correction and calibration of an input image (or input left and right images) using an image for a pattern projected by a projector.

Example embodiments of the present invention also provide a method for facilitating correction and calibration of an input image (or input left and right images) using an image for a pattern projected by a projector.

In some example embodiments, a system for performing distortion correction and calibration using pattern projection includes: a projector that projects a pattern; at least one camera that generates a photographed pattern image by photographing an image onto which the pattern is projected; and an image processing device that calculates a calibration parameter by comparing an original pattern image projected by the projector and the photographed pattern image.

Here, the projector and the at least one camera may be positioned on the same horizontal axis or vertical axis.

Also, the image processing device may include a pattern matching unit that sets at least one reference pattern in the original pattern image, sets a periphery of each of the at least one reference pattern in the photographed pattern image as a search region by utilizing x and y coordinates of a center point of each of the at least one reference pattern, and performs pattern matching between the at least one reference pattern and the search region.

Also, the pattern matching unit may set the at least one reference pattern in the original pattern image so that a portion corresponding to the photographed pattern image exists.

Also, the pattern matching unit may perform the pattern matching by tracking at least one of positional movement, angle conversion, and size conversion for a pattern included in the photographed pattern image with respect to a pattern included in the original pattern image based on the at least one reference pattern.

Also, the image processing device may further include a parameter calculation unit that calculates a plane equation using the tracked at least one of positional movement, angle conversion, and size conversion for the pattern included in the photographed pattern image, and calculates the calibration parameter based on the plane equation.

Also, the image processing device may further include a depth image generation unit that generates a depth image through an image whose distortion is corrected by applying the calibration parameter.

Also, the pattern may include a specific pattern including random dots or lines.

In other example embodiments, an image processing device using pattern projection in distortion correction and calibration using a pattern projected by a projector, includes: a pattern matching unit that compares an original pattern image of the projected pattern and a photographed pattern image obtained by photographing the projected pattern; a parameter calculation unit that calculates a calibration parameter by comparing the original pattern image and the photographed pattern image; and a depth image generation unit that generates a depth image by applying the calibration parameter.

Here, the pattern matching unit may set at least one reference pattern in the original pattern image, extract a region corresponding to the at least one reference pattern from the photographed pattern image, and perform pattern matching by tracking at least one of positional movement, angle conversion, and size conversion for a pattern included in the photographed pattern image with respect to a pattern included in the original pattern image based on the at least one reference pattern.

Also, the parameter calculation unit may calculate a plane equation using the tracked at least one of positional movement, angle conversion, and size conversion for the pattern included in the photographed pattern image based on the at least one reference pattern, and calculate the calibration parameter based on the plane equation.

In still other example embodiments, a method for performing distortion correction and calibration using pattern projection includes: projecting a pattern; generating a photographed pattern image by photographing an image onto which the pattern is projected; and calculating a calibration parameter by comparing an original pattern image projected by a projector and the photographed pattern image.

Here, the method for performing distortion correction and calibration may further include: generating a depth image by applying the calibration parameter.

Also, the pattern may include a specific pattern including random dots or lines.

Also, the calculating of the calibration parameter may include setting at least one reference pattern in the original pattern image, and performing pattern matching by extracting a region corresponding to the at least one reference pattern from the photographed pattern image.

Also, the setting of the at least one reference pattern may include setting a corresponding adjacent region with respect to center coordinates of the at least one reference pattern in the original pattern image, as a search region in the photographed pattern image.

Also, the performing of the pattern matching may include tracking at least one of positional movement, angle conversion, and size conversion for a pattern included in the photographed pattern image with respect to a pattern included in the original pattern image based on the at least one reference pattern.

Also, the calculating of the calibration parameter may include calculating a plane equation using the tracked at least one of positional movement, angle conversion, and size conversion for the pattern included in the photographed pattern image, and calculating the calibration parameter based on the plane equation.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. Also, specific structural and functional details disclosed herein are merely representative for purposes of describing the example embodiments of the present invention. However, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First, a three-dimensional (3D) depth camera that is used to obtain depth information of an image using left and right stereo cameras may extract and use binocular disparity characteristics from images photographed at mutually different viewpoints by the cameras.

For example, a pattern may be projected using a projector and an image of the projected pattern may be photographed to detect a position of the pattern in the other image corresponding to a specific position of the pattern in the image, so that a difference of the two positions, that is, a binocular disparity may be extracted, thereby directly calculating a distance from the camera to an actual position of the pattern.

Here, it is most important that an image of the pattern acquired from the camera is accurately shown, and for this, it is necessary to remove distortion, an error, or the like that occurs due to a camera lens and calibration of the camera.

In addition, due to an epipolar line constraint in calculating the distance, calibration between the projector and the camera or between the cameras becomes important.

Hereinafter, preferred embodiments of the present invention will be described in detail with reference to the accompanying drawings.

Figure 3:
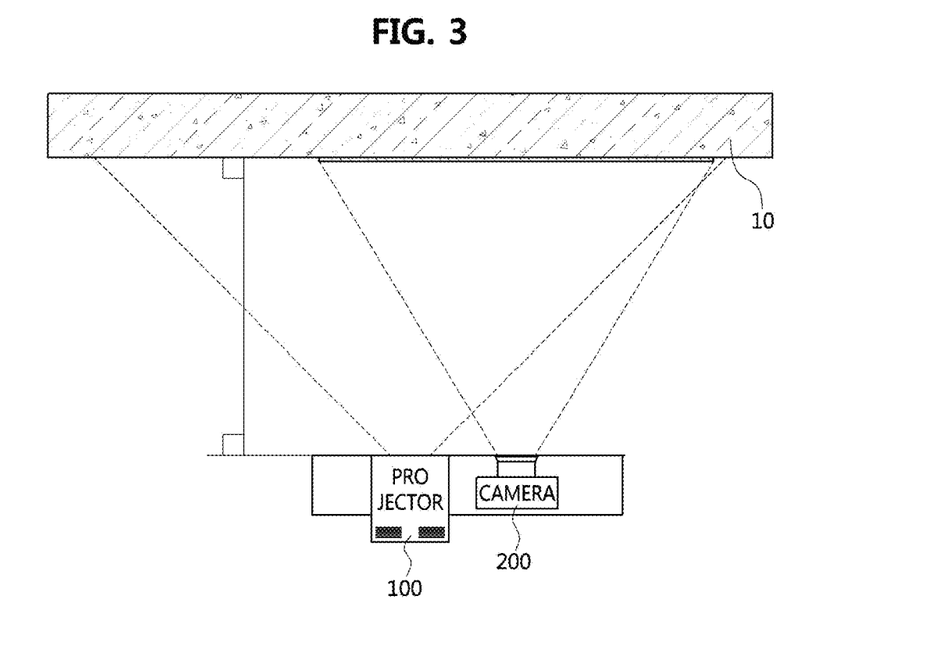
FIG. 3 is a conceptual view illustrating a method of calculating a calibration parameter using a projector and one camera according to an embodiment of the present invention.
Figure 4:
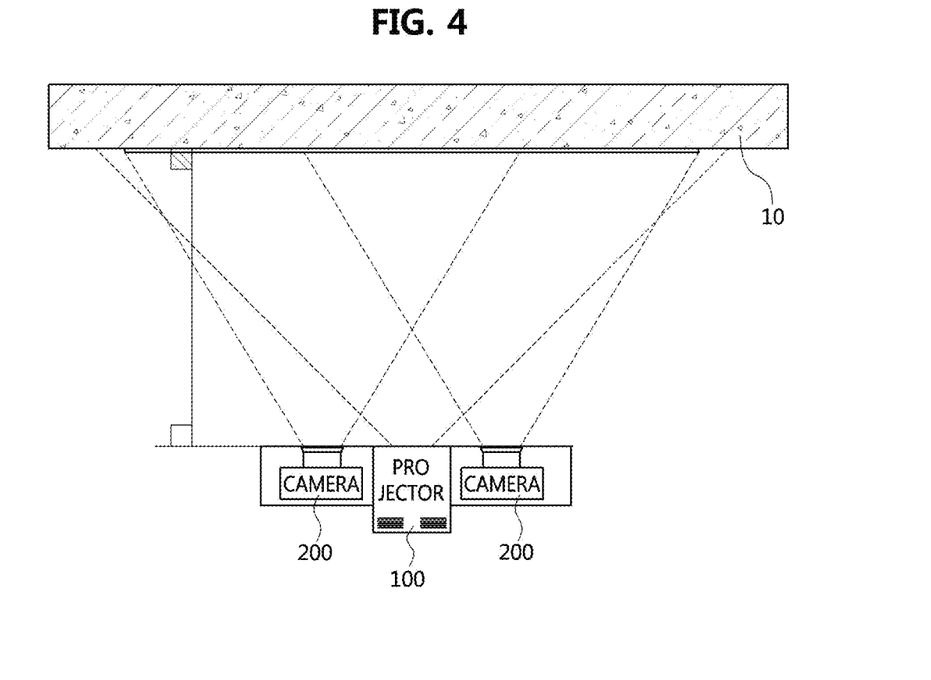
FIG. 4 is a conceptual view illustrating a method of calculating a calibration parameter using a projector and two cameras according to another embodiment of the present invention.

FIG. 3 is a conceptual view illustrating a method of calculating a calibration parameter using a projector 100 and a camera 200 according to an embodiment of the present invention, and FIG. 4 is a conceptual view illustrating a method of calculating a calibration parameter using a projector 100 and two cameras 200 according to another embodiment of the present invention.

Referring to FIG. 3, a method of performing distortion correction and calibration according to an embodiment of the present invention may be performed by the projector 100 and the camera 200.

The projector 100 and the camera 200 may be disposed on the same horizontal axis (or vertical axis). The projector 100 may project a pattern onto a screen 10, and the camera 200 may generate a photographed pattern image by photographing an image onto which the pattern is projected. Here, the photographed pattern image may refer to an image of the projected pattern obtained through the camera 200.

Basically, the projector 100 and the camera 200 may be positioned on the horizontal axis or the vertical axis, and therefore it is possible to acquire the photographed pattern image that does not completely coincide with an original pattern image but has a slight difference therebetween. Here, the original pattern image may refer to an original image having the pattern projected by the projector 100.

That is, the photographed pattern image may have a difference with the original pattern image due to image distortion caused by the camera lens or the like and a calibration problem of the camera 200.

A region in which the pattern is projected onto a screen 10 by the projector 100 should include all regions in which the image is photographed by the camera 200. That is, the pattern should be present in all regions in which the image is photographed by the cameras 200, and the region may be a region in which the distance is substantially calculated.

In addition, referring to FIG. 4, a method of acquiring a depth image according to an embodiment of the present invention may be performed by the projector 100 and the two cameras 200.

The projector 100 and the two cameras 200 may be disposed on the same horizontal axis. The projector 100 may project the pattern onto the screen 10, and each of the two cameras 200 may photograph the image of the projected pattern.

In the same manner as in FIG. 3, the pattern that is projected onto the screen 10 by the projector 100 should be projected to all regions in which the image is photographed by both of the cameras, and the regions in which the image is photographed by the respective cameras 200 may be superimposed. The superimposed regions may be the region in which the distance is substantially calculated.

In addition, in FIGS. 3 and 4, the image of the projected pattern is photographed using one or two cameras 200, but according to an embodiment of the present invention, it is obvious that the image of the projected pattern may be photographed by utilizing two or more of the cameras 200.

Figure 5:
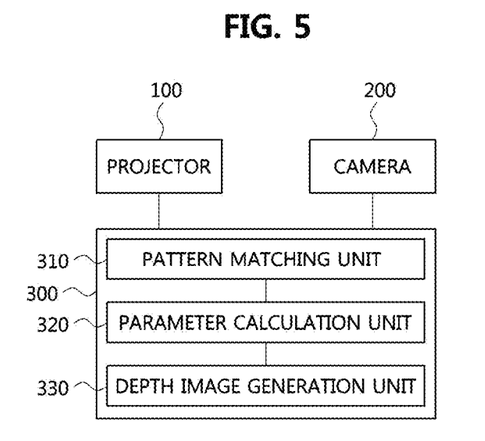
FIG. 5 is a block diagram illustrating a configuration of a system for performing distortion correction and calibration using pattern projection according to an embodiment of the present invention.

FIG. 5 is a block diagram illustrating a configuration of a system for performing distortion correction and calibration using pattern projection according to an embodiment of the present invention.

Referring to FIG. 5, the system for performing distortion correction and calibration using pattern projection according to an embodiment of the present invention includes the projector 100, the camera 200, and an image processing device 300.

The projector 100 may project a pattern. For example, the projector 100 may project the pattern including random dots or lines onto the screen 10.

The camera 200 may generate a photographed pattern image by photographing an image onto which the pattern is projected. It is obvious that the image onto which the pattern is projected may be photographed through at least one camera 200.

The image processing device 300 may calculate a calibration parameter by comparing an original pattern image projected by the projector 100 and the photographed pattern image. The image processing device 300 may store in advance the original pattern image that is the original pattern projected by the projector 100, and receive the photographed pattern image generated by the camera 200.

Thus, the image processing device 300 may be operated in conjunction with the projector 100 and the camera 200, and implemented as a microcontroller unit (MCU) or a microprocessor unit (MPU), a central processing unit (CPU), a graphics processing unit (GPU), a field programmable gate array (FPGA), an application specific IC (ASIC), a digital signal processor (DSP), or the like. A user of the system may control the projector 100 and the camera 200 through the image processing device 300.

That is, the image processing device 300 may calculate the calibration parameter for correcting image distortion caused by camera lens and a calibration state of the cameras 200 by comparing the original pattern image and the photographed pattern image.

Specifically, the image processing device 300 may include a pattern matching unit 310, a parameter calculation unit 320, and a depth image generation unit 330.

The pattern matching unit 310 may perform matching between a reference pattern included in the original pattern image and a pattern included in a search region in the photographed pattern image. That is, the pattern matching unit 310 may compare the original pattern image of the projected pattern and the photographed pattern image obtained by photographing the projected pattern.

The pattern matching unit 310 may set at least three reference patterns in the original pattern image, and extract a region corresponding to each of the reference patterns from the photographed pattern image to perform pattern matching.

For example, the pattern matching unit 310 may set at least one reference pattern so that the at least one reference pattern is positioned at a symmetrical position with respect to the center of the original pattern image. In addition, the pattern matching unit 310 may perform pattern matching by tracking positional movement, angle conversion, and size conversion for the pattern included in the photographed pattern image with respect to the pattern included in the original pattern image based on the at least one reference pattern.

The parameter calculation unit 320 may calculate a plane equation using the tracked positional movement, angle conversion, and the size conversion for the pattern included in the search region of the photographed pattern image.

For example, the parameter calculation unit 320 may calculate the plane equation in which a change in at least one of the tracked positional movement, angle conversion, and the size conversion for the pattern included in the photographed pattern image is the smallest based on at least one reference pattern that is set with respect to the center of the original pattern image. That is, the plane equation may be calculated in such a manner that a change of the pattern in each search region becomes the smallest.

In addition, the parameter calculation unit 320 may calculate the calibration parameter based on the plane equation.

The depth image generation unit 330 may generate the depth image by applying the calibration parameter calculated in the parameter calculation unit 320. Thus, the depth image generation unit 330 may generate the depth image in a state in which image distortion caused by camera lens and a calibration state of the cameras 200 is corrected.

The respective components of the image processing device 300 according to an embodiment of the preset invention have been listed and described for convenience of description, but at least two of the respective components may be combined as a single component or a single component may be divided into a plurality of components to perform corresponding functions. In this manner, examples in which each component is integrated or divided may be also included in the scope of the present invention without departing from the spirit of the present invention.

In addition, operations of the image processing device 300 may be implemented as a computer-readable program or code in a computer-readable recording medium. The computer-readable recording medium includes all types of recording devices in which data that can be read by a computer system is stored. In addition, the computer-readable recording medium can be also distributed over a network connected computer system so that the computer readable program or code is stored and executed in a distributed fashion.

Figure 6:
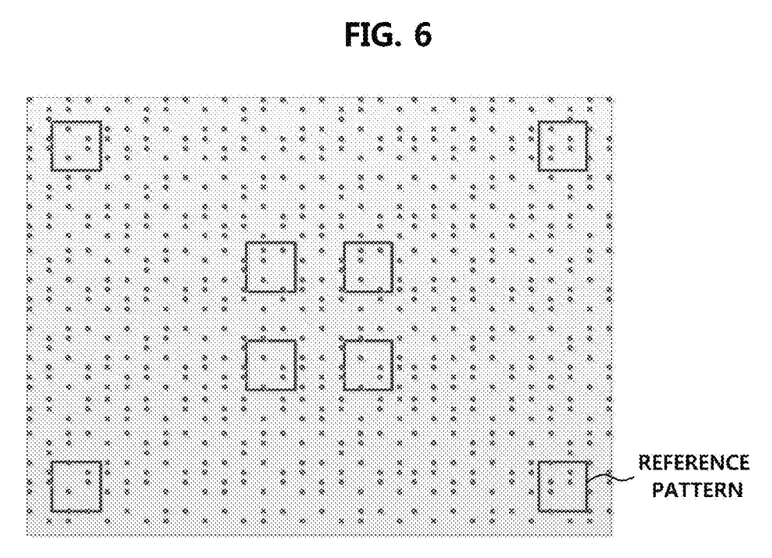
FIG. 6 is an exemplary view illustrating setting of a reference pattern on an original pattern image according to an embodiment of the present invention.

FIG. 6 is an exemplary view illustrating setting of a reference pattern on an original pattern image according to an embodiment of the present invention.

Referring to FIG. 6, according to an embodiment of the present invention, a reference pattern may be set in an original pattern image to perform pattern matching.

The original pattern image may have information about a pattern output by the projector 100, and have a specific pattern such as random dots, lines, or the like according to an algorithm.

In addition, according to an embodiment of the present invention, the original pattern image including the random dots or lines may refer to a pattern image that is previously known by a system developer.

According to an embodiment of the present invention, a search region may be adaptively set according to the form of the pattern included in the original pattern image.

For example, when the pattern of the original pattern image is a random dot pattern, a reference pattern may be set in predetermined regions of four corners in the original pattern image.

In addition, the search region may be set in a part of the photographed pattern image using center coordinates of the reference patterns in the original pattern image in order to obtain a plane equation. That is, the reference pattern may be set in windows having various sizes and in various positions. Thus, the reference pattern may be adaptively set by a user, and is not limited to the setting shown in FIG. 6.

Figure 7:
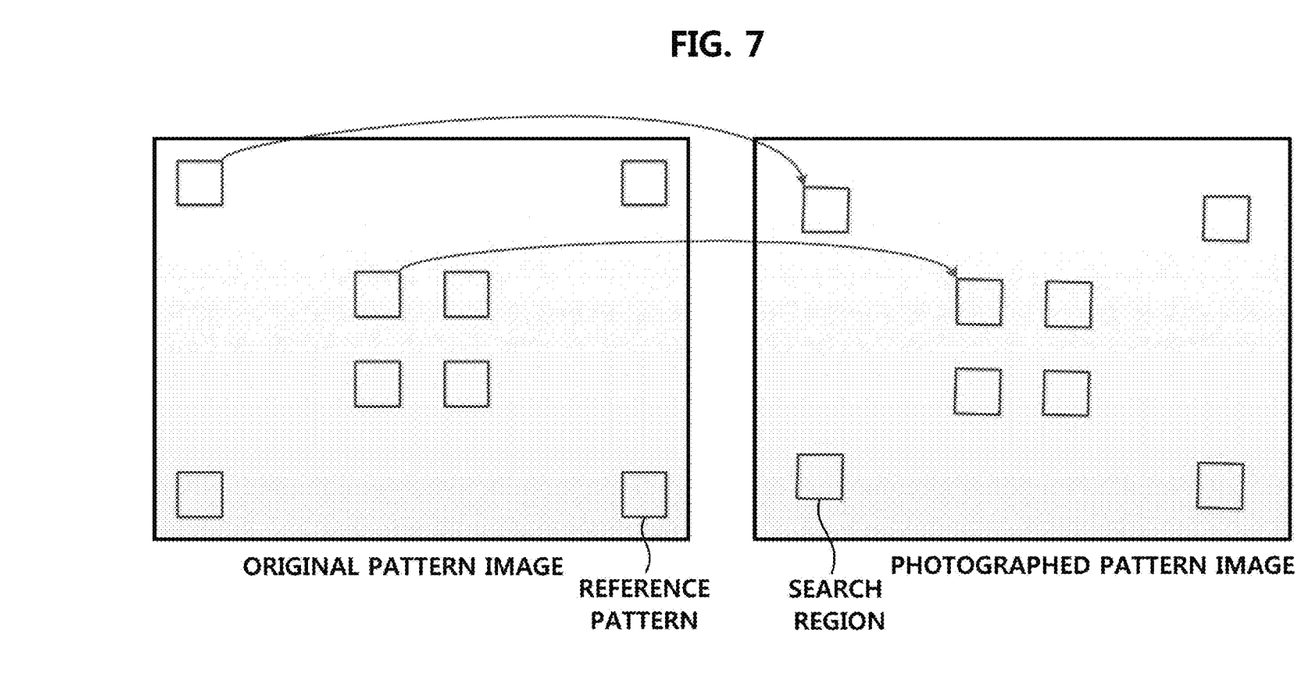
FIG. 7 is an exemplary view illustrating pattern matching between an original pattern image and a photographed pattern image according to an embodiment of the present invention.

FIG. 7 is an exemplary view illustrating pattern matching between an original pattern image and a photographed pattern image according to an embodiment of the present invention.

Referring to FIG. 7, matching between patterns included in the original pattern image and the photographed pattern image may be performed based on the reference pattern and the search region.

Pattern matching may be performed by tracking a corresponding pattern in the search region of the photographed pattern image with respect to the reference pattern included in the original pattern image. Conversion in the size, angle, and position of the pattern may occur due to the camera lens and the calibration state of the cameras 200.

For example, pattern matching with respect to 8 reference patterns may be performed. That is, pattern matching may be performed by tracking positional movement, angle conversion, and size conversion of the pattern with respect to the pattern included in the original pattern image and the pattern included in the photographed pattern image based on the reference pattern and the search region.

Thus, according to an embodiment of the present invention, a plane equation may be calculated by performing pattern matching. For example, center points of the photographed pattern image corresponding to the reference patterns of the original pattern image may be obtained, and one equation of a plane connecting outer four points of the center points and one equation of a plane connecting inner four points thereof may be obtained.

Figure 8:
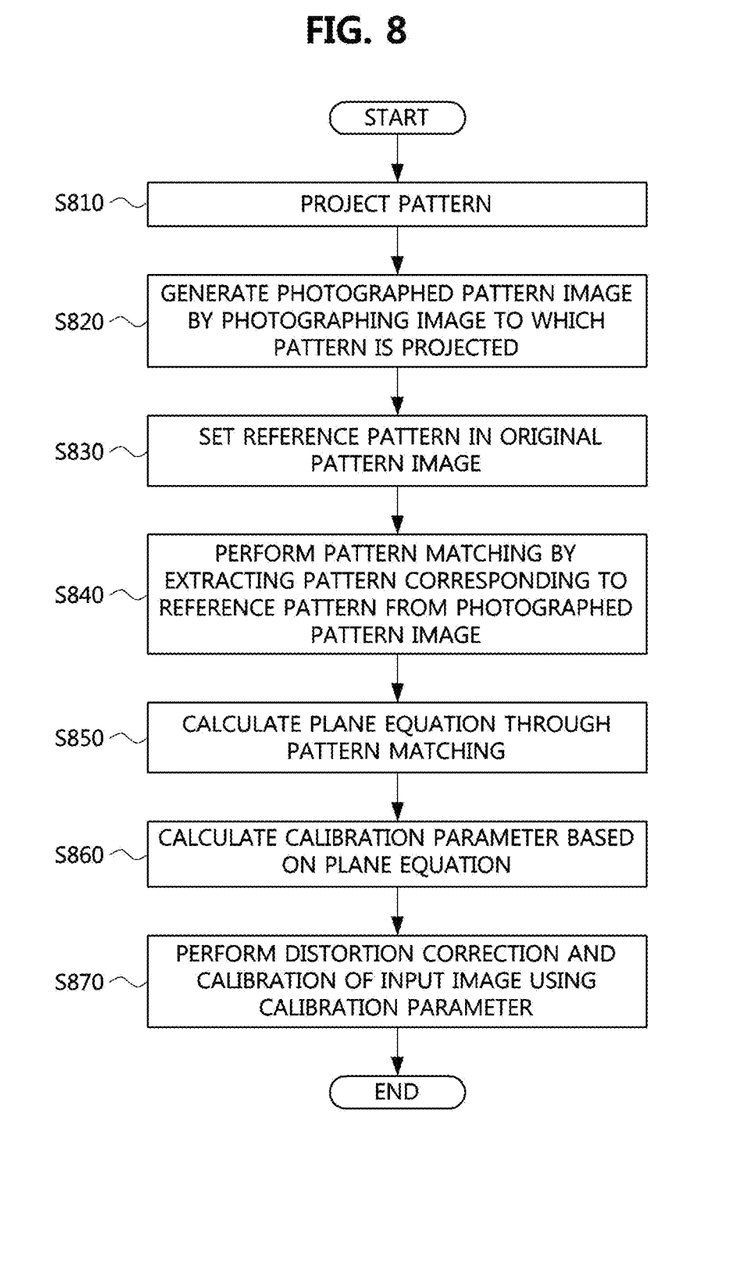
FIG. 8 is a flowchart illustrating a method for performing distortion correction and calibration using pattern projection according to an embodiment of the present invention.

FIG. 8 is a flowchart illustrating a method for performing distortion correction and calibration using pattern projection according to an embodiment of the present invention.

Referring to FIG. 8, the method for performing distortion correction and calibration using pattern projection according to an embodiment of the present invention may include projecting a pattern, generating a photographed pattern image by photographing an image onto which the pattern is projected, and calculating a calibration parameter by comparing an original pattern image projected by the projector 100 and the photographed pattern image. In addition, the method for performing distortion correction and calibration using pattern projection according to an embodiment of the present invention may further include generating a depth image by applying the calibration parameter.

First, in operation S810, the method may project a pattern using the projector 100. The pattern projected by the projector 100 may be constituted of random dots or lines.

In operation S820, the method may generate the photographed pattern image by photographing the image onto which the pattern is projected using at least one camera 200. For example, as the at least one camera 200, a monocular camera or a binocular camera may be used. That is, the image to which the pattern is projected may be photographed using one camera 200 or two cameras 200, but according to an embodiment of the present invention, the image to which the pattern is projected may be photographed by utilizing the two cameras 200 or more.

In operation S830, the method may set at least one reference pattern in the original pattern image that is the original of the pattern projected by the projector 100.

For example, predetermined regions of four corners in the original pattern image may be set as the reference pattern. In addition, four additional regions may be further set in a symmetrical position with respect to the center of the original pattern image. That is, the at least one reference pattern may be set to be positioned in the symmetrical position with respect to the center of the original pattern image.

In operation S840, the method may perform pattern matching by extracting a pattern corresponding to a pattern included in the original pattern image in the at least one reference pattern from the photographed pattern image. That is, the method may track the pattern corresponding to the pattern included in the original pattern image from the photographed pattern image based on the reference pattern through pattern matching.

For example, in operation S850, the method may calculate a plane equation by tracking at least one of positional movement, angle conversion, and size conversion for the pattern included in the search region of the photographed pattern image with respect to the pattern included in the original pattern image based on the at least one reference pattern.

Specifically, the method may calculate the plane equation in which changes in the tracked positional movement, angle conversion, and size conversion for the pattern included in the photographed pattern image become the smallest based on the at least one reference pattern set with respect to the center of the original pattern image.

In addition, in operation S860, the method may calculate a calibration parameter based on the plane equation. Thus, the original pattern image and the photographed pattern image may be allowed to coincide with each other using the calibration parameter, and the method may perform distortion correction and calibration of the input image using the calibration parameter in operation S870. In addition, the method may generate an accurate depth image by applying the calibration parameter.

The system and method for performing distortion correction and calibration using pattern projection according to the embodiments of the present invention may extract the calibration parameter for correcting image distortion caused by camera lens and the calibration state of the cameras 200.

In particular, according to the embodiments of the present invention, compared to a method using an existing checkerboard, one photographed pattern image may be utilized. In addition, in order to increase accuracy of the depth image, a user of the system may easily utilize the image for the projected pattern by the projector 100 without photographing the image about the checkerboard in various angles and conditions.

Thus, the user of the system may easily acquire the depth image in a state in which distortion of the image that may occur according to the camera lens and the calibration state of the cameras 200 is corrected.

As described above, the system and method for performing distortion correction and calibration using pattern projection according to the embodiments of the present invention may easily perform distortion correction of the image and calibration of cameras using the image for the pattern projected by the projector.

In addition, when obtaining the depth image, a calibration parameter for correcting image distortion according to camera lens and the calibration state of cameras may be efficiently obtained using the pattern projected by the projector.

While the example embodiments of the present invention and their advantages have been described in detail, it should be understood that various changes, substitutions and alterations may be made herein without departing from the scope of the invention.

What is claimed is:

1. A system, comprising:
   a projector that projects an original pattern image onto a screen;
   at least one camera that captures the original pattern image projected onto the screen and provides the captured image as a photographed pattern image, the photographed pattern image including image distortion caused by camera lens and a calibration state of the at least one camera; and
   an image processing device comprising at least one processor and a memory storing instructions configured to instruct the at least one processor to perform:
      calculating a calibration parameter by comparing the original pattern image with the photographed pattern image, the calibration parameter for correcting the image distortion in the photographed pattern image,
   wherein the calibration parameter is calculated using a plane equation obtained based on a difference between the original pattern image and the photographed pattern image, wherein the calibration parameter is applied to the photographed pattern image to correct the image distortion, and wherein the comparing the original pattern image with the photographed pattern image comprises:
  setting at least one reference pattern in the original pattern image;
  extracting a search region from the photographed pattern image by utilizing x and y coordinates of a center point of the at least one reference pattern; and
  performing pattern matching between the at least one reference pattern and a pattern in the search region, the search region corresponding to a region including a periphery of the at least one reference pattern.

2. The system of claim 1, wherein the projector and the at least one camera are positioned on the same horizontal axis or vertical axis.

3. The system of claim 1, wherein the setting at least one reference pattern in the original pattern image comprises setting the at least one reference pattern in the original pattern image so that a portion corresponding to the at least one reference pattern exists in the photographed pattern image.

4. The system of claim 1, wherein the performing pattern matching comprises tracking at least one of positional movement, angle conversion, and size conversion for a pattern included in the search region with respect to a reference pattern included in the original pattern image based on the at least one reference pattern.

5. The system of claim 4, wherein the calculating a calibration parameter comprises:
  obtaining the plane equation using the tracked at least one of positional movement, angle conversion, and size conversion for the pattern included in the search region; and
  calculating the calibration parameter based on the plane equation.

6. The system of claim 5, wherein the instructions are further configured to instruct that at least one processor to perform generating a depth image by applying the calibration parameter to the photographed pattern image that includes the image distortion, the depth image corresponding to the photographed pattern image whose image distortion has been corrected.

7. The system of claim 1, wherein the original pattern image includes a specific pattern including random dots or lines.

8. An image processing device, comprising:
  at least one processor; and
  a memory storing instructions configured to instruct the at least one processor to perform:
    comparing an original pattern image projected by a projector with a photographed pattern image obtained by a camera, the photographed pattern image including image distortion caused by camera lens and a calibration state of the camera, the comparison being performed by setting at least one reference pattern in the original pattern image, extracting a search region from the photographed pattern image by utilizing x and y coordinates of a center point of the at least one reference pattern, and performing pattern matching between the at least one reference pattern and a pattern in the search region, the search region corresponding to the at least one reference pattern;
    calculating a calibration parameter using a plane equation, which is obtained based on a difference between the original pattern image and the photographed pattern image, the difference being obtained by the pattern matching; and
    generating a depth image by applying the calibration parameter to the photographed pattern image, the depth image corresponding to the photographed pattern image whose image distortion has been corrected.

9. The image processing device of claim 8, wherein the comparing an original pattern image projected by a projector comprises:
  setting the at least one reference pattern in the original pattern image;
  extracting the search region corresponding to a region including a periphery of the at least one reference pattern from the photographed pattern image; and
  performing the pattern matching by tracking at least one of positional movement, angle conversion, and size conversion for a pattern included in the search region with respect to a reference pattern included in the original pattern image based on the at least one reference pattern.

10. The image processing device of claim 9, wherein the calculating a calibration parameter comprises:
  obtaining the plane equation using the tracked at least one of positional movement, angle conversion, and size conversion for the pattern included in the search region based on the at least one reference pattern; and
  calculating the calibration parameter based on the plane equation.

11. A method, comprising:
projecting an original pattern image onto a screen;
generating a photographed pattern image by capturing the projected original pattern image using at least one camera, the photographed pattern image including image distortion caused by camera lens and a calibration state of the at least one camera; and
calculating a calibration parameter by comparing the original pattern image with the photographed pattern image, the calibration parameter for correcting the image distortion in the photographed pattern image, wherein the calibration parameter is calculated using a plane equation obtained based on a difference between the original pattern image and the photographed pattern image, wherein the calibration parameter is applied to the photographed pattern image to correct the image distortion, and wherein the calculating of the calibration parameter includes:
  setting at least one reference pattern in the original pattern image and a search region in the photographed pattern image; and
  performing pattern matching between the at least one reference pattern and a pattern in the search region.

12. The method of claim 11, further comprising:
generating a depth image by applying the calibration parameter to the photographed pattern image that includes the image distortion, the depth image corresponding to the photographed pattern image whose image distortion has been corrected.

13. The method of claim 11, wherein the original pattern image includes a specific pattern including random dots or lines.

14. The method of claim 11, wherein the setting of the at least one reference pattern includes setting a corresponding adjacent region with respect to center coordinates of the at least one reference pattern in the original pattern image, as the search region in the photographed pattern image.

15. The method of claim 11, wherein the performing of the pattern matching includes tracking at least one of positional movement, angle conversion, and size conversion for a pattern included in the search region with respect to a reference pattern included in the original pattern image based on the at least one reference pattern.

16. The method of claim 15, wherein the calculating of the calibration parameter includes
    obtaining the plane equation using the tracked at least one of positional movement, angle conversion, and size conversion for the pattern included in the search region, and
    calculating the calibration parameter based on the plane equation.

\* \* \* \* \*